United States Patent
Kofuji et al.

(10) Patent No.: US 7,810,603 B2
(45) Date of Patent: Oct. 12, 2010

(54) COMPACT SWING ARM STRUCTURE FOR A SHAFT-DRIVEN VEHICLE, AND VEHICLE INCORPORATING SAME

(75) Inventors: Kenji Kofuji, Saitama (JP); Koichi Nozoe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 12/002,682

(22) Filed: Dec. 18, 2007

(65) Prior Publication Data
US 2008/0156571 A1    Jul. 3, 2008

(30) Foreign Application Priority Data
Dec. 28, 2006    (JP) .............. 2006-356453

(51) Int. Cl.
*B60G 9/02*    (2006.01)
(52) U.S. Cl. .............. 180/358; 180/226; 280/124.116; 280/124.128
(58) Field of Classification Search .............. 180/226, 180/227, 219, 358, 348; 280/124.11, 124.116, 280/124.128
See application file for complete search history.

(56) References Cited

U.S. PATENT DOCUMENTS

| | | | | |
|---|---|---|---|---|
| 4,436,173 | A * | 3/1984 | Takahashi | 180/226 |
| 4,664,215 | A * | 5/1987 | Suzuki et al. | 180/226 |
| 6,290,017 | B1 * | 9/2001 | Ito | 180/227 |
| 6,932,178 | B2 * | 8/2005 | Soatti | 180/226 |
| 7,419,028 | B2 * | 9/2008 | Yamakura et al. | 180/291 |
| 7,533,751 | B2 * | 5/2009 | Handa et al. | 180/210 |
| 7,584,814 | B2 * | 9/2009 | Nakanishi | 180/227 |
| 7,644,797 | B2 * | 1/2010 | Kofuji | 180/227 |
| 7,665,562 | B2 * | 2/2010 | Utsumi et al. | 180/226 |
| 7,665,563 | B2 * | 2/2010 | Misaki et al. | 180/227 |
| 2006/0278456 | A1 * | 12/2006 | Desrosiers | 180/219 |
| 2006/0278458 | A1 * | 12/2006 | Toyoda | 180/227 |
| 2007/0193806 | A1 * | 8/2007 | Ito et al. | 180/227 |
| 2008/0234055 | A1 * | 9/2008 | Nimura et al. | 464/134 |
| 2009/0057046 | A1 * | 3/2009 | Kofuji | 180/226 |
| 2009/0058030 | A1 * | 3/2009 | Fujita et al. | 280/124.128 |

(Continued)

FOREIGN PATENT DOCUMENTS

DE    26 16 101 C2    10/1977

(Continued)

*Primary Examiner*—Paul N Dickson
*Assistant Examiner*—Drew Brown
(74) *Attorney, Agent, or Firm*—Carrier, Blackman & Associates, P.C.; Joseph P. Carrier; William D. Blackman

(57) ABSTRACT

A swing arm structure, in a shaft-driven vehicle, is configured and arranged compactly to minimize the size and weight thereof. A drive shaft of the vehicle is housed in a right arm portion of a swing arm. A front end of the drive shaft is connected to a powertrain output shaft via a universal joint. A pivot sleeve is disposed such that a central axis thereof is disposed downwardly and rearwardly of a central portion of the universal joint, and a front-end opening protrudes forwardly of the pivot sleeve. The central portion of the universal joint, having the largest diameter, is disposed forwardly of the center of a pivot shaft. This helps to keep the opening diameter small at the front of the right arm portion.

18 Claims, 8 Drawing Sheets

U.S. PATENT DOCUMENTS

2009/0233723 A1* 9/2009 Kofuji ..................... 464/158
2009/0236168 A1* 9/2009 Nimura et al. ............. 180/348

FOREIGN PATENT DOCUMENTS

| EP | 1 361 149 A1 | 11/2003 |
| JP | 51-56748 U | 5/1976 |
| JP | U S62-43090 | 3/1987 |

* cited by examiner

COMPACT SWING ARM STRUCTURE FOR A SHAFT-DRIVEN VEHICLE, AND VEHICLE INCORPORATING SAME

CROSS-REFERENCE TO RELATED APPLICATIONS

The present application claims priority under 35 USC §119 based on Japanese patent application No. 2006-356453, filed on Dec. 28, 2006. The entire subject matter of this priority document is herein incorporated by reference.

BACKGROUND OF THE INVENTION

1. Field of the Invention

The present application relates to a compact swing arm structure for a shaft-driven vehicle, such as a motorcycle, and a to a vehicle incorporating such swing arm structure.

Shaft-driven motorcycles have a pivot shaft and a drive shaft, respectively disposed such that axes thereof cross each other in a top plan view. Vertically, these axes may be orthogonal to each other or offset from each other, not intersecting. This type of swing arm is known as a non-intersecting swing arm. In an embodiment of the present invention, the pivot shaft supports a front end of a swing arm, while the drive shaft is housed longitudinally in a hollow portion inside the swing arm.

2. Background Art

German Patent No. 2616101 shows a motorcycle having the non-intersecting type of swing arm. This swing arm or rocker has a tubular member that accommodates a drive shaft. The drive shaft includes a universal joint that appears to have its center of pivotal motion disposed directly above the center of pivotal motion of the swing arm.

With the orthogonal type, a commonly found universal joint may be sufficient for use as a joint between the drive shaft and an engine output shaft. The pivot shaft is, however, divided by the universal joint. To enhance suspension stiffness, therefore, it becomes necessary to make a bearing span of the pivot shaft long or enhance stiffness at a bearing portion of the pivot shaft. Having a long bearing span, however, results in a wider vehicle body width and narrower bank angle. Enhancing stiffness at the bearing portion, on the other hand, leads to an increased swing arm weight. In either case, both of these swing arm arrangements contribute to a larger size and a heavier weight of the vehicle and/or frame.

Adoption of the non-intersect type swing arm, on the other hand, does not result in the pivot shaft being divided by the universal joint. Accordingly, an ample bearing span can be obtained without having to enlarge the swing arm width. Use of a constant-velocity universal joint, however, becomes necessary for the joint. Further, the joint and the pivot shaft disposed by being vertically offset from each other results in a larger diameter at a front end of the swing arm, larger by a height of the joint and the pivot shaft. As a result, the swing arm becomes larger and heavier, if not equivalent to the orthogonal swing arm type. There is also a need for a lighter unsprung weight and, for that matter, for a lighter swing arm.

It is therefore an object of the present invention to make a vehicle width compact by adopting an improved non-intersect type swing arm, thereby achieving reduction in weight.

BRIEF SUMMARY OF THE INVENTION

To achieve the foregoing object, according to a first aspect of the present invention, there is provided a shaft-driven vehicle that includes a swing arm, a drive shaft, and a universal joint. The swing arm has a front end pivotally movably supported by a pivot shaft on a vehicle body frame. The drive shaft is disposed longitudinally in a space formed inside the swing arm. The universal joint connects a front end of the drive shaft with an output shaft of a power unit disposed on a vehicle body. Additionally, the drive shaft and the pivot shaft are disposed so as to cross each other in a plan view and such that an axis of the drive shaft is offset vertically from an axis of the pivot shaft. The power unit drives, via the drive shaft, a rear wheel supported on a rear end of the swing arm. In this shaft-driven vehicle, the universal joint has a center of pivotal motion disposed forwardly of a center of pivotal motion of the swing arm.

According to a second aspect of the present invention, the universal joint has a diameter that is the largest near the center of pivotal motion and becomes smaller toward a rear portion thereof.

According to a third aspect of the present invention, there is provided a swing arm structure for a shaft-driven vehicle. The swing arm structure includes a swing arm, a drive shaft, and a universal joint. The swing arm has a front end pivotally movably supported by a pivot shaft on a vehicle body frame. The drive shaft is disposed longitudinally in a space formed inside the swing arm. The universal joint connects a front end of the drive shaft with an output shaft of a power unit disposed on a side of a vehicle body. Further, the drive shaft and the pivot shaft are disposed so as to cross each other in a plan view and such that an axis of the drive shaft is offset vertically from an axis of the pivot shaft.

In this swing arm structure, the swing arm includes a pair of arm portions consisting of hollow pipes disposed on either side of a rear wheel. The drive shaft is disposed inside a first of the arm portions. A lower wall on an outer periphery of the first arm portion is connected to a pivot support portion. A second of the arm portions is disposed such that a centerline in a vertical width overlaps, in a side view, with a-line connecting the pivot shaft and a rear wheel axle. The first and the second arm portions are connected together by a cross portion or member at longitudinally intermediate portions thereof. The cross portion extends from the first to the second arm portion obliquely downwardly.

According to a fourth aspect of the present invention, the second arm portion has a diameter smaller than the first arm portion.

According to a fifth aspect of the present invention, the swing arm is formed through one-piece casting of the first and second arm portions and the cross portion.

In accordance with the first aspect of the present invention, the universal joint has its center of pivotal motion disposed forwardly of the center of pivotal motion of the swing arm. This allows a portion in the swing arm for accommodating the center of pivotal motion of the universal joint, which becomes the largest space provided in the swing arm for passing the drive shaft therethrough, to be disposed so as not to overlap vertically with the pivot support portion. Accordingly, the swing arm can be built compactly to achieve further reduction in weight.

In accordance with the second aspect of the present invention, the universal joint is adapted to have the largest diameter the at a portion thereof near the center of pivotal motion and diminishing toward the rear thereof. As a result, the portion of the swing arm accommodating the universal joint and the drive shaft, and rearward of the center of pivotal motion can be built compactly.

In accordance with the third aspect of the present invention, of the pair of first and second hollow pipe arm portions, the outer periphery of the arm portion, in which the drive shaft is disposed, has the lower wall connected to the pivot support portion. This allows the drive shaft housing and the pivot support portion to be vertically integrated together. The second arm portion is disposed such that the centerline of its vertical width in the side view overlaps with the line connecting the pivot shaft and the rear wheel axle. Accordingly, the second arm portion can be built compactly by being formed linearly.

Moreover, the cross portion is extended obliquely to connect the first arm portion and the second arm portion. This allows the compactly built second arm portion to be integrally connected to the larger first arm portion, achieving further reduction in weight.

In accordance with the fourth aspect of the present invention, even with the second arm portion adapted to have a diameter smaller than the first arm portion, both arm portions can be connected with the inclined cross portion. This allows the other arm portion to be built even more compactly.

In accordance with the fifth aspect of the present invention, the first and second arm portions and the cross portion are formed through one-piece casting, so that the swing arm of a hollow integrated structure can be easily formed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A specific embodiment of the present invention will be described below with reference to the accompanying drawings. It should be understood that only structures and methodology needed for illustrating selected embodiments of the present invention are described herein. Other conventional structures, and those of ancillary and auxiliary components of the system, will be known and understood by those skilled in the art.

Figure 1:
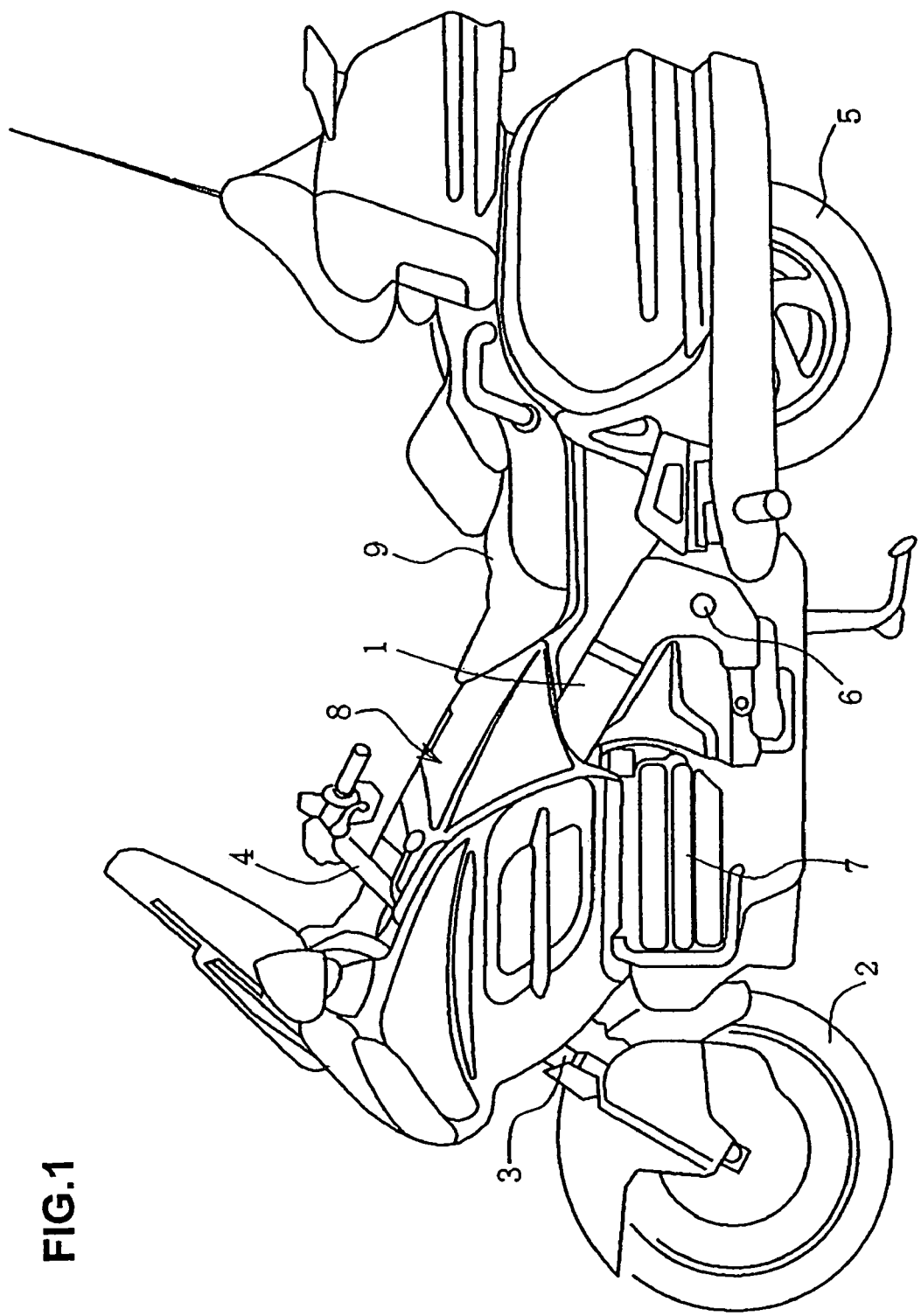
FIG. 1 is a side elevational view showing a shaft-driven motorcycle incorporating a compact swing arm structure in accordance with an illustrative embodiment of the present invention.

FIG. 1 is a side elevational view of a large shaft-driven motorcycle incorporating a compact swing arm structure according to an illustrative embodiment of the present invention. A front wheel 2 is supported on a vehicle body frame 1 via a front fork 3, and this wheel is steered by a handlebar 4.

A rear wheel 5 is supported on a rear end of a swing arm 10 (FIG. 2), to be described later herein.

In FIG. 1, reference numeral 6 denotes a pivot shaft. Reference numeral 7 denotes a horizontally opposed engine, a power source used for driving the rear wheel 5. Further, reference numeral 8 denotes a fuel tank and reference numeral 9 denotes a seat.

Figure 2:
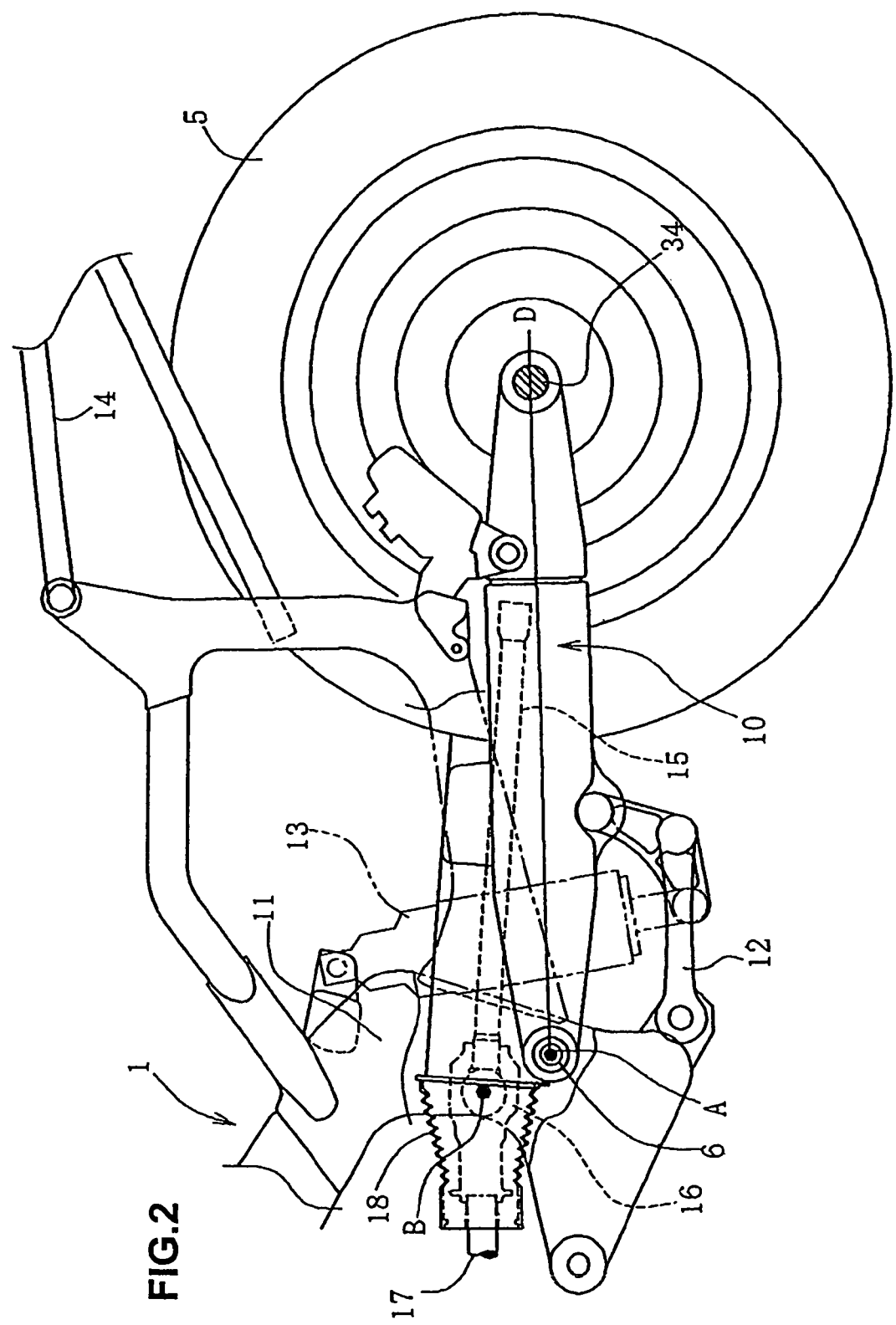
FIG. 2 is a side elevational view showing a rear wheel suspension portion in accordance with the illustrative embodiment of the present invention.

FIG. 2 is a side elevational view showing a rear wheel suspension portion according to an illustrative embodiment hereof. The swing arm 10, which supports the rear wheel 5 at the rear end thereof, has a front end pivotally supported via the pivot shaft 6 on a pivot plate 11 disposed at a rear portion of the vehicle body frame 1. A suspension link 12 is disposed between a lower surface at a longitudinal intermediate portion of the swing arm 10 and a lower end of the pivot plate 11. A rear cushion comprising a shock absorber 13 has a lower end connected to the suspension link 12. The rear cushion 13 has an upper end extended upwardly through a front portion of the swing arm 10. The upper end of the rear cushion 13 is supported on an upper portion of the pivot plate 11. In FIG. 2, reference numeral 14 represents a seat rail supporting the seat 9.

The swing arm 10 includes a hollow arm portion therein to be described later. A drive shaft 15 is housed longitudinally in the hollow arm portion. The drive shaft 15 has a front end connected to an output shaft 17 of the engine 7 via a universal joint 16. The pivot shaft 6 has a central axis A offset longitudinally and vertically from a central portion B of the universal joint 16. The central axis A is disposed behind and below the central portion B. The central axis A serves as a center of pivotal motion of the swing arm 10. The central portion B serves as a center of pivotal motion of the universal joint 16. More accurately, the central portion B is a center of pivotal motion of the drive shaft 15 relative to the output shaft 17 and an intersection point of two mutually orthogonal shafts in a cross shaft (to be described later) of the universal joint 16. In FIG. 2, reference numeral 18 denotes a bellows boot covering the output shaft 17 and the universal joint 16.

Further referring to FIG. 2, a straight line D represents a line connecting the central axis A of the pivot shaft 6 with a center of a rear wheel axle 34.

Figure 3:
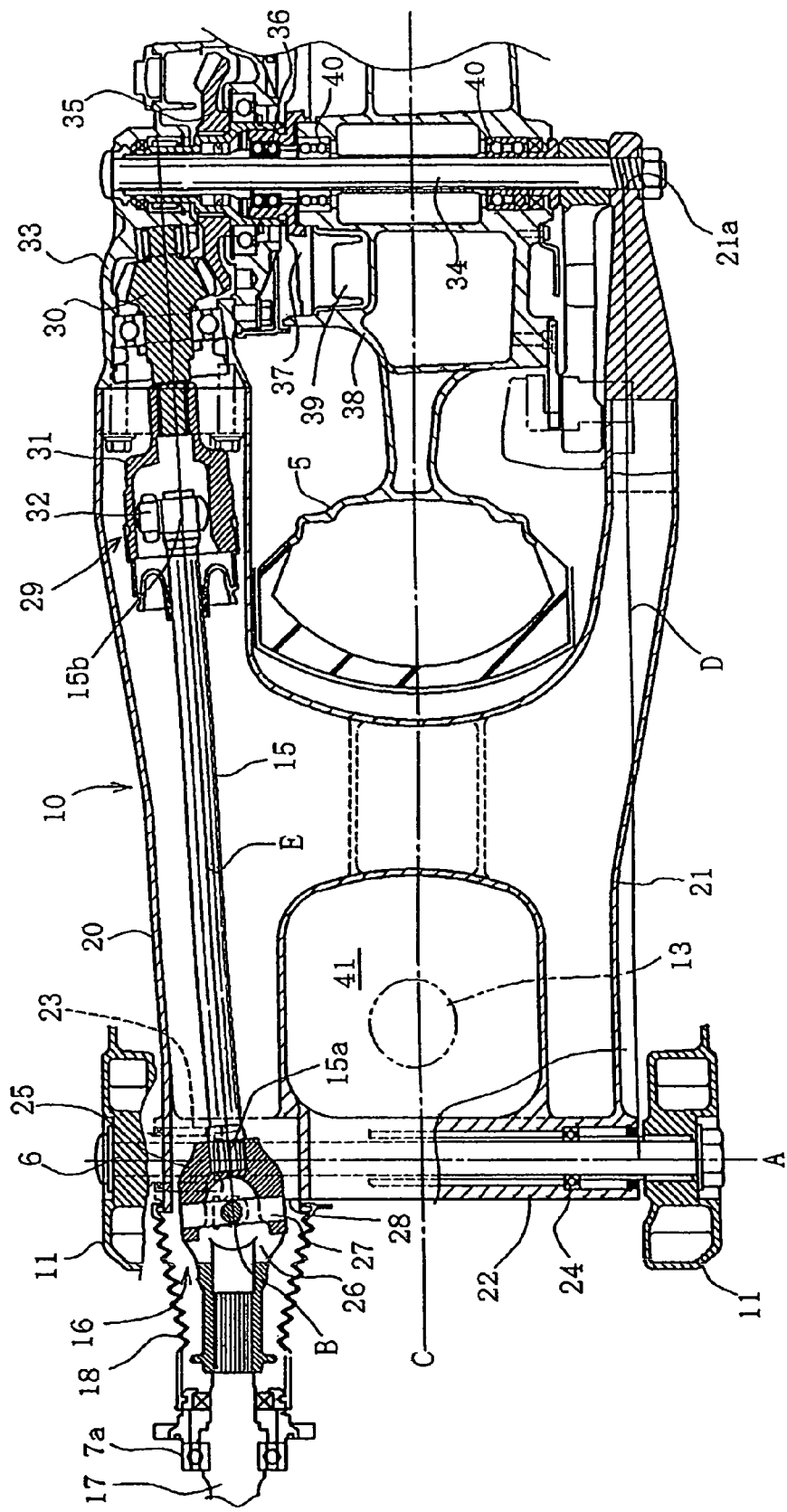
FIG. 3 is a top plan sectional view showing the rear wheel suspension portion of FIG. 2.

FIG. 3 is a top plan sectional view showing the swing arm 10. The swing arm 10 has a pair of left and right arm portions, including a hollow right arm portion 20 and a left arm portion 21. Both ends of the right arm portion 20 in the longitudinal direction are open, so that the right arm portion 20 forms a housing for the drive shaft 15. A pivot sleeve 22, extended lengthwise in a vehicle width direction, integrally connects front ends of the right arm portion 20 and the left arm portion 21. The pivot sleeve 22 has a bearing mounted therein including first and second bearing portions 23, 24 mounted therein, on opposite ends in a lengthwise direction thereof.

The pivot shaft 6, which passes through the bearing portions 23, 24, has both ends in a lengthwise direction thereof supported by left and right pivot plates 11. In the depicted embodiment, the bearing portion 23 includes a needle bearing, while the bearing portion 24 includes a ball bearing.

The drive shaft 15 is disposed extending in a substantially longitudinal direction by being accommodated in the hollow portion of the right arm portion 20. A yoke 25 constituting part of the universal joint 16 is in splined connection with a front-end 15a of the drive shaft 15. The yoke 25 is connected to another yoke 26 through a cross shaft 27. A rear end of the output shaft 17 is in splined connection with the yoke 26. The output shaft 17 is supported by a bearing portion 7a on the side of the engine. The boot 18 has a front end locked onto the bearing portion 7a. Further, the boot 18 has a rear end locked onto a periphery around a front-end opening 28 in the right arm portion 20. In FIG. 3, reference numeral E denotes an axis of the drive shaft.

The central portion B of the universal joint 16 is disposed forwardly of the front-end opening 28 in the right arm portion 20. The central portion B is extended forwardly of a connection of the yokes 25, 26 and the cross shaft 27, the connection forming a portion in the universal joint 16 having the largest diameter. Specifically, an area near the central portion B is extended forwardly of the right arm portion 20. As a result, the front-end opening 28 can have a diameter smaller than the maximum diameter of the universal joint 16.

Additionally, the universal joint 16 has a diameter that tapers inwardly toward the rear, to become gradually smaller toward the rear from the central portion B.

The drive shaft 15 has a rear end 15b connected to a bevel gear 30 on a drive side via a constant-velocity universal joint 29. The constant-velocity universal joint 29 includes a joint cup 31 and a roller 32. The roller 32 is included in the rear end 15b of the drive shaft 15 fitted into an inside of the joint cup 31.

The joint cup 31 rotates integrally with the drive shaft 15 and makes the rear end 15b of the drive shaft 15 axially movable. This absorbs a stroke change occurring as a result of the swing arm 10 pivotally moving about the pivot shaft 6, or about the central axis A that is different from the central portion B of the universal joint 16. The constant-velocity universal joint 29 may be any type of known structure.

The bevel gear 30 is in splined connection with the joint cup 31. The bevel gear 30 meshes with a second bevel gear 35 on a driven side disposed on the rear wheel axle 34 inside a gear box 33 mounted at a rear end of the right arm portion 20. The second bevel gear 35 is supported on the rear wheel axle 34 via a bearing 36. A flange 37 integrated with the second bevel gear 35 is connected to a rear wheel hub 38 via a damper 39. The rear wheel hub 38 is rotatably supported on the rear wheel axle 34 via a bearing 40.

The rear wheel axle 34 has a first end supported by the gear box 33, and a second end passing through the rear wheel hub 38 and supported by a rear end of the left arm portion 21.

A driving force transmitted from the engine to the output shaft 17 is transmitted to the drive shaft 1 by way of the universal joint 16. The driving force is further transmitted to the second bevel gear 35 from the bevel gear 30 through the constant-velocity universal joint 29. The driving force is then transmitted to the rear wheel hub 38 from the flange 37 that is integrated with the second bevel gear 35. This allows the power drive from the engine to rotatably drive the rear wheel 5 about the rear wheel axle 34.

The swing arm 10 includes a through-hole space 41 formed vertically therein at a central front-end portion thereof. The shock absorber 13 passes vertically through this through-hole space 41.

Figure 4:
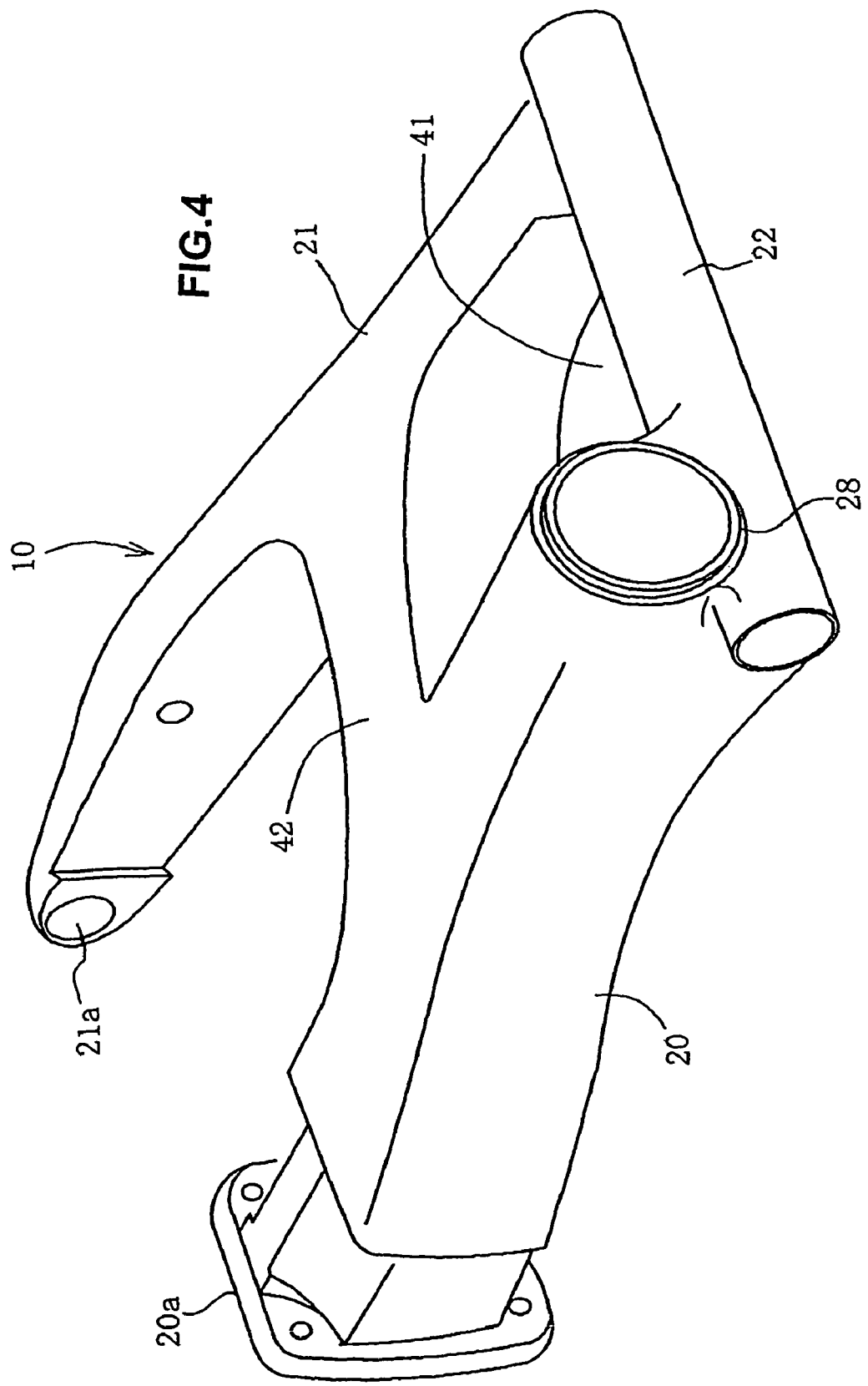
FIG. 4 is a perspective view of a swing arm in accordance with the illustrative embodiment of the present invention.

FIG. 4 is a perspective view of the swing arm 10, shown isolated from other components in a rotated configuration viewed from a vantage point at the front end thereof. Therefore, it will be understood that the right arm portion 20 is shown on the left in FIG. 4 because of the rotated configuration. The swing arm 10 is formed from a light metal alloy or other appropriate material using a casting or other appropriate manufacturing technique.

The right arm portion 20 is formed into a pipe shape having a diameter larger than the left arm portion 21. The front end opening 28 is circular in shape, and disposed above the pivot sleeve 22. A lower wall of a peripheral portion surrounding the front end opening 28 is connected to the pivot sleeve 22, so that the drive shaft housing is vertically integrated with the pivot sleeve 22.

The right and left arm portions 20, 21 are integrally connected at respective front ends thereof by the pivot sleeve 22. The right and left arm portions 20, 21 are also integrally connected at intermediate portions thereof by a crossmember 42. The through-hole space 41 is formed centrally between the left and right arm portions 20, 21 and longitudinally between the pivot sleeve 22 and the crossmember 42, as seen in FIGS. 3-5.

The rear end of the right arm portion 20 forms a connection flange 20a, provided for attachment to the gear box 33. The rear end of the left arm portion 21 has an axle hole 21a formed therein and extending in the width direction of the vehicle.

Figure 5:
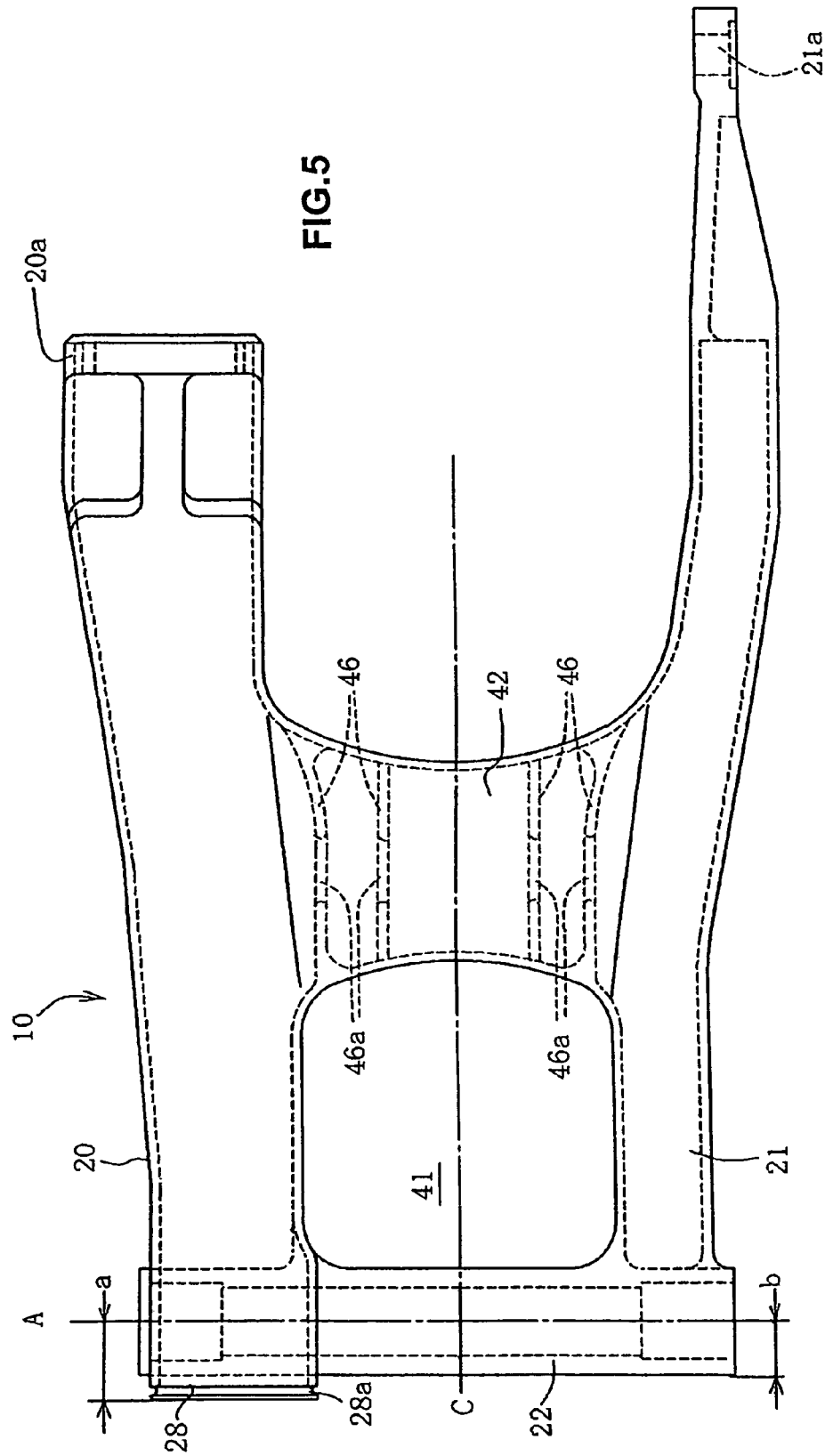
FIG. 5 is a top plan view of the swing arm of FIG. 4.

FIG. 5 is a top plan view of the swing arm 10. The right arm portion 20 is broader than the left arm portion 21 and has a shorter rear portion than the left arm portion 21 does. The front end opening 28 is extended slightly forwardly from the pivot sleeve 22. Accordingly, a distance 'a', between a centerline A of the pivot sleeve 22 and a front end of the right arm portion adjacent the opening 28, is greater than a distance 'b' between a front end of the left arm portion 21 and the centerline A (a>b). It is to be noted that the front end of the left arm portion 21 coincides with the front end of the pivot sleeve 22.

Figure 6:
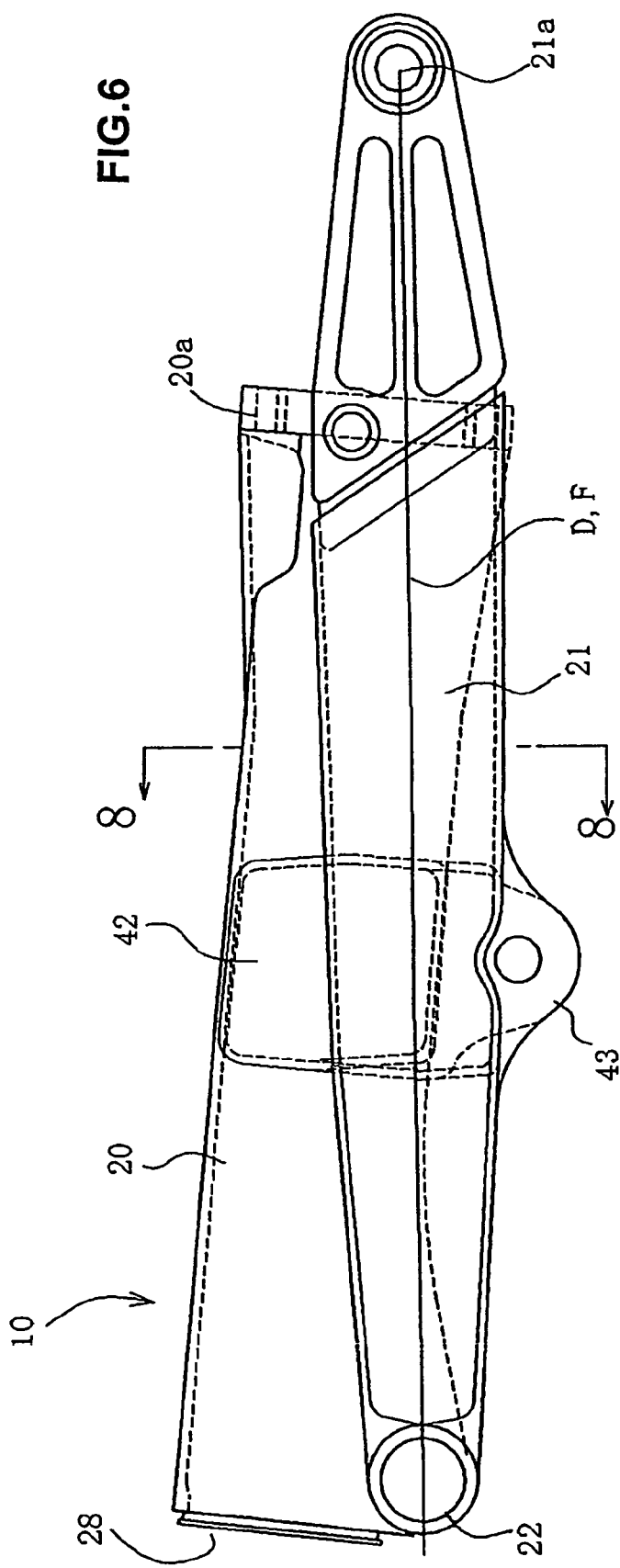
FIG. 6 is a left side elevational view of the swing arm of FIGS. 4-5.

FIG. 6 is a left side elevational view showing the swing arm 10. FIG. 6 shows that the right arm portion 20 protrudes upwardly beyond the left arm portion 21. The crossmember 42 also has a side adjacent the right arm portion 20 higher than a side adjacent the left arm portion 21. The crossmember 42 includes a link stay 43 formed integrally therewith on a lower surface thereof so as to protrude downwardly.

In FIG. 6, reference numeral F denotes a centerline of the left arm portion 21 in the side view. The centerline F is a line formed by connecting substantially central points in a vertical width direction of the left arm portion 21. The centerline F substantially overlaps a line D as best seen in FIG. 2 connecting a center of the pivot sleeve 22 and a center of the axle hole 21a.

Figure 7:
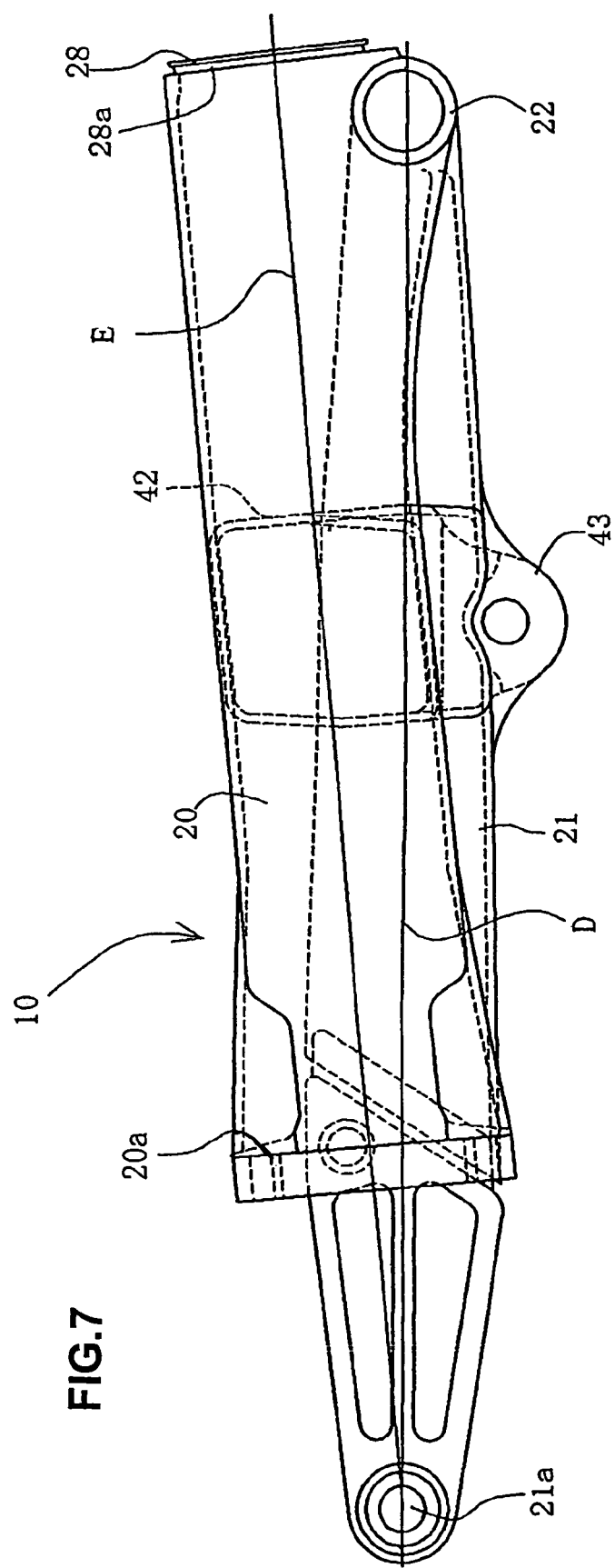
FIG. 7 is a right side elevational view of the swing arm of FIGS. 4-6.

FIG. 7 is a right side elevational view showing the swing arm 10. FIG. 7 shows that the right arm portion 20 has a lower surface that is concavely curved upwardly. As a result, the longitudinally intermediate portion of the right arm portion 20 is disposed above the left arm portion 21. The crossmember 42 also protrudes further downwardly on the side of the left arm portion 21 than on the side of the right arm portion 20. The pivot sleeve 22 is formed integrally with a lower portion at a front end of the right arm portion 20. The pivot sleeve 22 is open sideways. An engagement slit 28a, with which the boot 18 is engaged, is formed surrounding a periphery of the front end opening 28.

The axis E of the drive shaft 18 is inclined slightly upwardly toward the front, while the line D is inclined slightly downwardly toward the front and diverging from the axis E, as seen in FIG. 7. The axis E therefore crosses the line D at the center of the axle hole 21a. The axis E is disposed above the line D in an area forward of the axle hole 21a.

Figure 8:
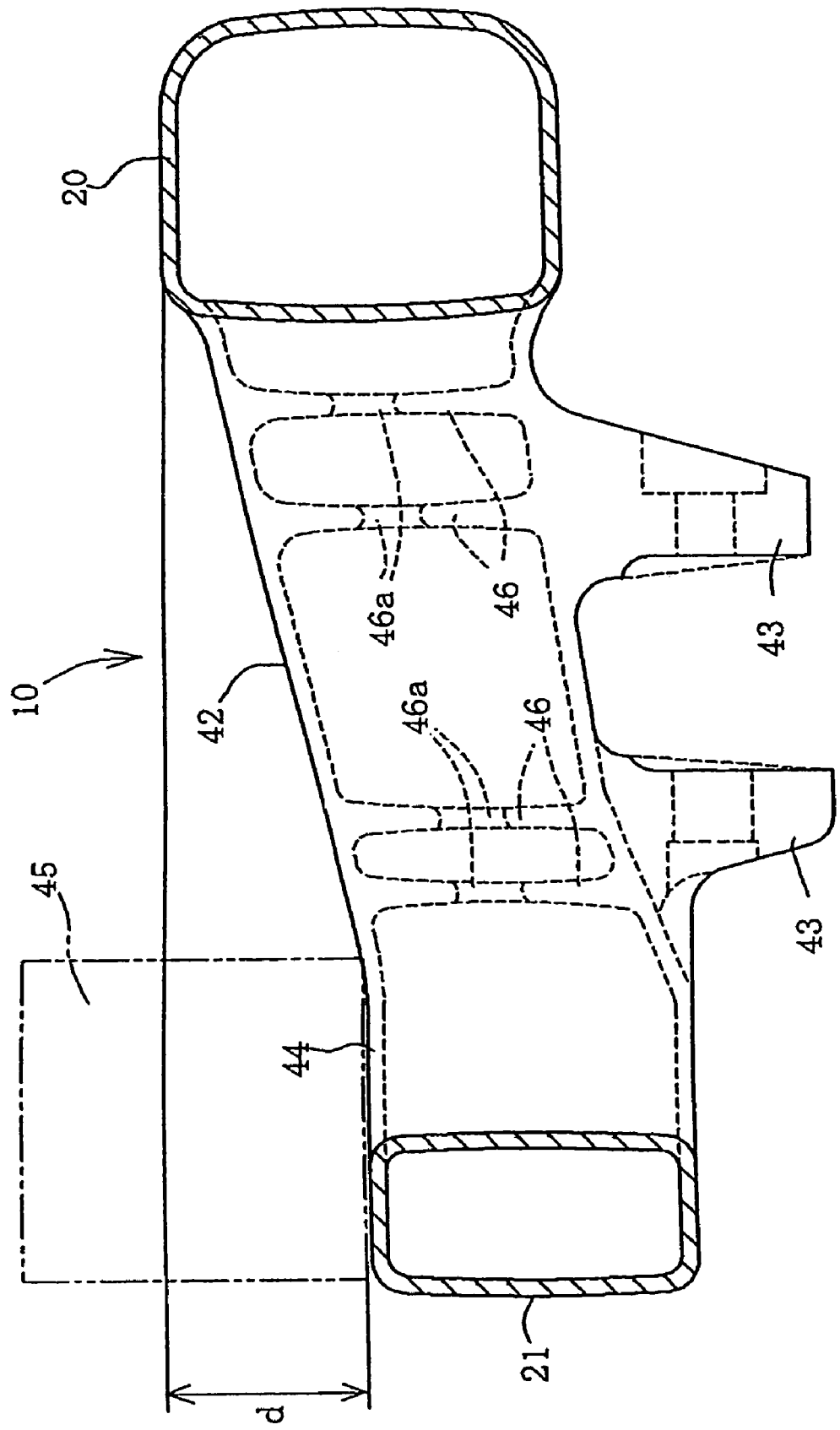
FIG. 8 is a cross-sectional view of the swing arm, taken along line 8-8 of FIG. 6.

FIG. 8 is a cross-sectional view of the swing arm 10, taken along line 8-8 of FIG. 6. The right arm portion 20 and the left arm portion 21 each have a substantially rectangular cross-sectional shape at this portion. The right arm portion 20 is larger in area than the left arm portion 21, expanded in both vertical and horizontal directions as shown in the drawing. In addition, because the right arm portion 20 is higher at this part of the structure, the crossmember 42 slopes downwardly as it moves from the right arm portion 20 toward the left arm portion 21. At the same time, an upper surface of the right arm portion 20 is elevated above an upper surface of the left arm portion 21, having a height difference of 'd' therebetween. As the upper surface of the left arm portion 21 is lower in height, the upper surface of the left arm portion may serve as a flat loading surface 44. A battery 45, for example, or any other appropriate part may be supported on the flat loading surface 44, so that a vehicle height can be lowered when an article is placed on the swing arm 10. In FIG. 8, reference numeral 46 denotes a number of reinforcement ribs for strengthening and reinforcing the crossmember 42. The reinforcement ribs 46 protrude inwardly of the crossmember 42 above the link stay 43. Each of the reinforcement ribs 46 includes a respective opening 46a for casting (FIGS. 5 and 8).

Operation of the swing arm according to the illustrative embodiment of the present invention will be described below. Referring to FIGS. 2 and 3, the central portion B of the universal joint 16 is disposed forwardly relative to the center (axis) A of the pivot shaft 6, about which the swing arm 10 pivotally moves. This achieves the following arrangement. Specifically, the portion accommodating the central portion B of the universal joint 16 and having the largest space provided in the right arm portion 20 for passing the drive shaft 15 therethrough does not overlap vertically with the pivot sleeve 22 as a pivot support portion. As a result, the swing arm 10 can be built compactly to achieve reduction in weight as compared to conventional designs.

The universal joint 16 is adapted to have the largest diameter near the central portion B thereof and the diameter becoming gradually smaller toward the rear. Accordingly, the portion of the drive shaft housing behind the central portion B can be built more compactly.

Further, of the pair of right and left arm portions 20, 21 forming hollow pipes, the right arm portion 20, through which the drive shaft 15 is disposed, has an outer periphery, the lower wall of which is connected to the pivot sleeve 22. As a result, the drive shaft housing can be vertically integrated with the pivot sleeve 22. Additionally, the centerline F of a vertical width of the left arm portion 21 in a side view is disposed so as to overlap the line D connecting the pivot shaft 6 and the rear wheel axle 34. Accordingly, the left arm portion 21 can be built compactly by being formed linearly.

Moreover, the crossmember 42 is extended at an inclined angle relative to horizontal, to connect the right and left arm portions 20, 21. This allows the compactly built left arm portion 21 to be integrally connected to the larger right arm portion 20, achieving further reduction in weight.

Even with the left arm portion 21 adapted to have a diameter smaller than the right arm portion 20, both arm portions can be connected with the inclined crossmember 42. This allows the left arm portion 21 to be built even more compactly.

Additionally, the right and left arm portions 20, 21 and the crossmember 42 are formed through one-piece casting, so that the swing arm 10 of a hollow integrated structure can be easily formed.

The foregoing description is intended to illustrate, rather than to limit the invention. The present invention is not intended to be limited to the embodiments mentioned heretofore and those having normal skill in the art will recognize various changes, modifications, additions, and applications other than those specifically mentioned herein without departing from the spirit of the present invention. All such modifications, which are within the scope of the claims, are intended to be within the scope and spirit of the present invention.

For example, the universal joint 16 may be a constant-velocity universal joint. If the universal joint 16 is disposed according to the embodiment of the present invention, however, the position of the central portion B can be fixed in the longitudinal direction. Accordingly, the amount of forward protrusion of the universal joint 16 from the pivot shaft 6 can be minimized. This minimizes the amount of forward protrusion of the engagement slit 28a of the front-end opening 28, achieving reduction in size and weight.

We claim:
1. A shaft-driven vehicle, comprising:
  a vehicle body frame;
    a power unit disposed on the vehicle body frame and comprising an output shaft;
    a pivot shaft extending through a rear portion of the vehicle body frame;
      a swing arm having a front end pivotally movably supported by the pivot shaft on the vehicle body frame, the swing arm having a hollow space defined therein;
  a drive shaft disposed longitudinally in the space inside the swing arm;
    a rear wheel rotatably supported on a rear end of the swing arm, the power unit operatively driving the rear wheel via the drive shaft; and
  a universal joint connecting a front end of the drive shaft with the output shaft of the power unit, the drive shaft and the pivot shaft being disposed so as to cross each other in a plan view and such that an axis of the drive shaft is offset vertically from an axis of the pivot shaft, wherein the universal joint has a center of pivotal motion disposed forwardly of a center of pivotal motion of the swing arm.

2. The shaft-driven vehicle according to claim 1, wherein:
the universal joint has a diameter that is largest near the center of pivotal motion and becomes smaller toward a rear portion thereof.

3. The shaft driven vehicle of claim 1, wherein:
the swing arm comprises first and second arm portions,
the swing arm has a first width at the front end thereof and a second width at the rear end thereof which is wider than the first width, and
the second arm portion is smaller in diameter than the first arm portion.

4. A shaft-driven vehicle having a vehicle body and a power unit operatively attached to the vehicle body, the vehicle further comprising a swing arm structure comprising:
  a swing arm having a front end pivotally supported by a pivot shaft on the vehicle body frame;
  a drive shaft disposed longitudinally in a space formed inside the swing arm; and
  a universal joint connecting a front end of the drive shaft with an output shaft of the power unit disposed on a side of the vehicle body, the drive shaft and the pivot shaft being disposed so as to cross each other in a top plan view, and arranged such that an axis of the drive shaft is offset vertically from an axis of the pivot shaft;
  wherein the swing arm includes a pair of arm portions comprising hollow pipes disposed on either side of a rear wheel, the drive shaft is disposed inside a first of the arm portions, a lower wall on an outer periphery of the first arm portion is connected to a pivot support portion, a second of the arm portions is disposed such that a longitudinal axis thereof is substantially aligned, in a side view, with a line connecting the pivot shaft and a rear wheel axle, the first and the second arm portions are connected together by a cross portion at longitudinally intermediate portions thereof, and the cross portion extends downwardly at an inclined angle from the first arm portion to the second arm portion.

5. The swing arm structure according to claim 4, wherein the second arm portion has a diameter smaller than the first arm portion.

6. The swing arm structure according to claim 4, wherein the swing arm is formed through one-piece casting of the first and second arm portions and the cross portion.

7. A shaft-driven vehicle having a vehicle body frame and a power unit operatively attached to the vehicle body frame, the vehicle further comprising a swing arm structure comprising:
a swing arm having a front end pivotally movably supported by a pivot shaft on the vehicle body frame, the swing arm including first and second arm portions, each arm portion being hollow and connected together by a pivot sleeve which receives the pivot shaft therein,
a drive shaft disposed longitudinally in a space formed inside the swing arm,
and a universal joint connecting a front end of the drive shaft with an output shaft of the power unit disposed on a side of the vehicle body frame, the drive shaft and the pivot shaft being disposed so as to cross each other in a top plan view, and arranged such that an axis of the drive shaft is offset vertically from an axis of the pivot shaft,
wherein the second arm portion has a diameter smaller than the first arm portion,
wherein the first and second arm portions of the swing arm structure are integrally formed in a single piece,
and wherein the universal joint has a center of pivotal motion which is spaced away from a vertical plane passing through the axis of the pivot shaft.

8. The swing arm structure of claim 7, wherein:
the first arm portion accommodates the drive shaft,
a first end of the first arm portion is adjacent the pivot shaft, and
a second end of the first arm portion is vertically offset from the first end thereof.

9. The swing arm structure of claim 8, wherein the second arm portion is disposed such that a longitudinal centerline thereof coincides with a line connecting a central axis of the pivot shaft and a rear wheel axle center of rotation.

10. The swing arm structure of claim 7, wherein the first and second arm portions are further connected by a crossmember.

11. The swing arm structure of claim 10, wherein the crossmember is formed integrally with the first and second arm portions.

12. The swing arm structure of claim 10, further comprising a shock absorber which passes through an aperture formed between the first and second arm portions and the crossmember.

13. The swing arm structure of claim 10, wherein the swing arm has an aperture formed therein which is bordered by the first and the second arm portions, the pivot sleeve and the crossmember.

14. The swing arm structure of claim 7, wherein a first end of the first arm portion has a front opening formed therein, and the front opening is extended forward of the pivot sleeve.

15. The swing arm structure of claim 14, wherein the first end of the second arm portion is substantially even with the front of the pivot sleeve.

16. The swing arm structure of claim 14, wherein the first arm has an engagement slit formed therein in the periphery of the front opening.

17. The swing arm structure of claim 7, wherein the upper surface of the second arm portion provides a flat loading surface for retaining parts.

18. The swing arm structure of claim 7, wherein the crossmember is hollow and comprises a plurality of reinforcing ribs.

* * * * *